United States Patent [19]

Compton

[11] Patent Number: 5,246,189
[45] Date of Patent: Sep. 21, 1993

[54] EXTENSION LINES

[75] Inventor: Timothy A. Compton, Lubbock, Tex.

[73] Assignee: Industrial Business Consultants, Inc., Lubbock, Tex.

[21] Appl. No.: 739,815

[22] Filed: Aug. 2, 1991

[51] Int. Cl.[5] .................................................. F16L 3/00
[52] U.S. Cl. ...................................... 248/52; 406/167
[58] Field of Search .................... 248/68.1, 49, 52; 406/167, 116

[56] References Cited

U.S. PATENT DOCUMENTS

| | | | |
|---|---|---|---|
| 901,490 | 10/1908 | Sellers | 406/116 |
| 1,957,975 | 5/1934 | Mustonen | 406/116 |
| 3,872,881 | 3/1975 | Miller et al. | 248/68.1 X |
| 4,352,608 | 10/1982 | Stuller et al. | 406/116 |
| 4,436,457 | 3/1984 | Willingham | 406/116 |

Primary Examiner—Blair M. Johnson
Attorney, Agent, or Firm—Wendell Coffee

[57] ABSTRACT

A device is provided for preventing flexible lines such as hydraulic hoses or electrical cables from being fouled or damaged as they run along telescoping suction pipe. Conduits are clamped to the inside pipe of the moving part of the suction pipe and a guide roller is placed upon the sleeve of the suction pipe. The conduit is guided by the guide and the flexible lines are telescoped within the conduits or strapped to the side of the conduits.

7 Claims, 2 Drawing Sheets

EXTENSION LINES

BACKGROUND OF THE INVENTION (1) Field of the Invention

This invention relates to mechanical sliding elements, particularly to telescoping pneumatic conveyors such as suction pipes as used in cotton gins. More particularly the invention concerns remotely controlled suction pipes wherein electrical or hydraulic lines extend to the suction pipe head.

(2) Description of the Related Art

In the cotton ginning arts a pneumatic conveyor is referred to as a suction pipe and will be herein. In recent times many of these suction pipes are made to have expandable horizontal joints or telescoping joints. Such joints are shown in U.S. Pat. Nos. 4,436,457 to WILLINGHAM, 4,470,729 to FREDENBURG et al and 4,352,608 to STULLER et al. As will be noted, these suction pipes all have a horizontal run and a vertical run. The top of the vertical run is called a suction head. Often there are motors at the suction head, either electrical or hydraulic.

There is a problem having the lines extending from the stationary sleeve portion to the moving suction head. The lines often become fouled with the moving portions of the telescoping suction pipe. These telescoping suction pipes include telescoping joints and they also often include tracks. The lines not only become tangled or fouled, but also are run over by wheels along the tracks or caught within the telescoping joints.

WILLINGHAM shows a horizontal suction pipe and a separate track from which electric cables are suspended.

SUMMARY OF THE INVENTION (1) Progressive Contribution to the Art

I have invented a structure and method for preventing the lines (whether hydraulic hoses or electric cables) from being fouled and damaged. A conduit is attached to the suction head or its carriage and extended parallel to the axis of the telescoping joint. Upon the stationary portion of the telescoping joint a roller guide is placed so that the conduit can roll along the roller guide. The conduit is long enough to accommodate the movement of the head while still being guided by the roller guide. The lines can either be inserted through the conduit or strapped to the outside of the conduit. Thus the lines are supported by the conduit. At the end of the conduits there is sufficient excess lines to accommodate the movement of the head. The lines are anchored to the stationary portion of the suction pipe at that point.

(2) Objects of this Invention

An object of this invention is to protect lines extending to a moveable structural part that moves back and forth along a stationary path.

Further objects are to achieve the above with devices that are sturdy, compact, durable, lightweight, simple, safe, efficient, versatile, ecologically compatible, energy conserving, and reliable, yet inexpensive and easy to manufacture, install, and maintain.

Other objects are to achieve the above with a method that is rapid, versatile, ecologically compatible, energy conserving, efficient, and inexpensive, and does not require highly skilled people to install, and maintain.

The specific nature of the invention, as well as other objects, uses, and advantages thereof, will clearly appear from the following description and from the accompanying drawings, the different views of which are not necessarily scale drawings.

Figure 1:
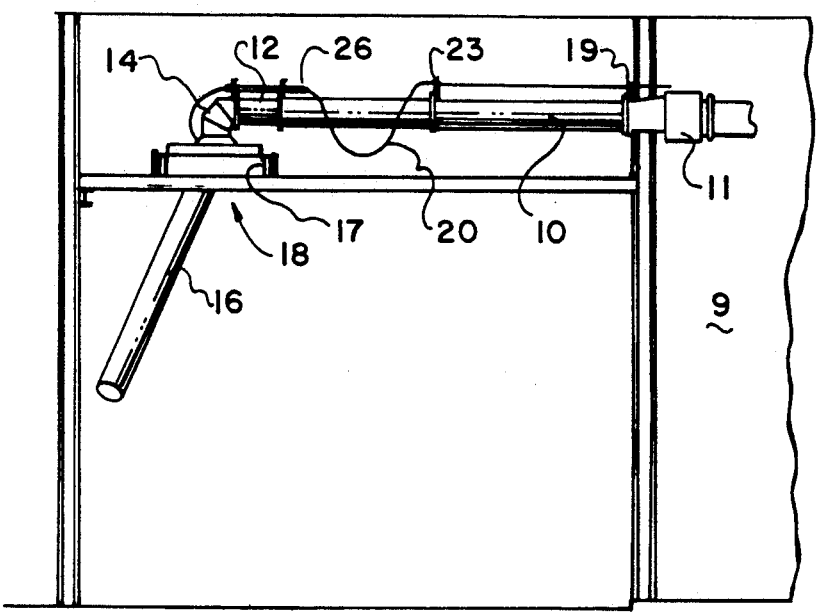
FIG. 1 is a side elevational view of the suction shed adjacent to a cotton gin with the invention.
Figure 2:
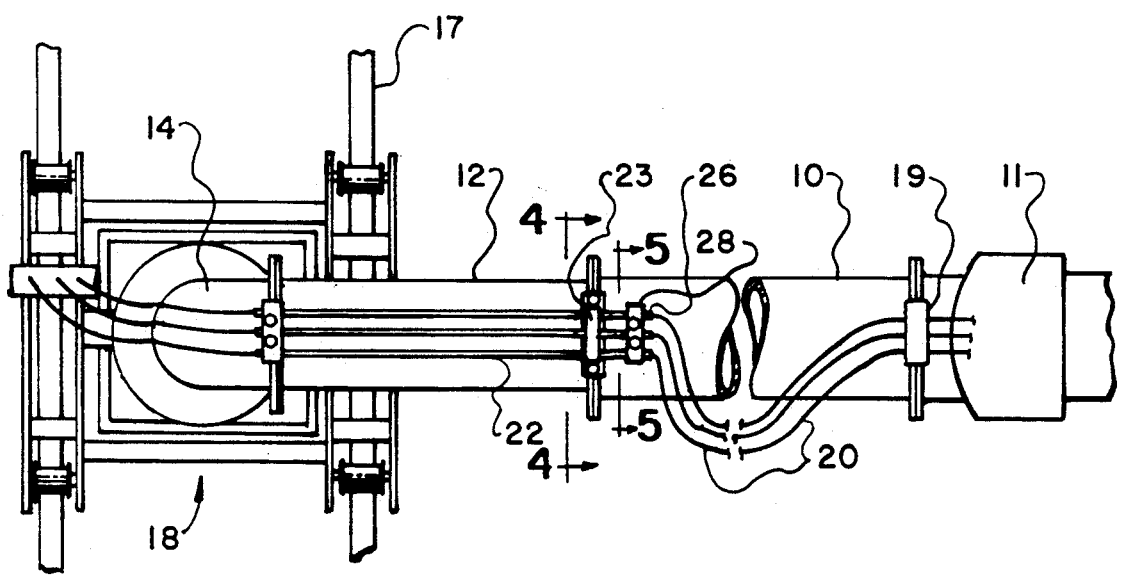
FIG. 2 is a top plan view of the invention and some of the equipment within the suction shed.
Figure 3:
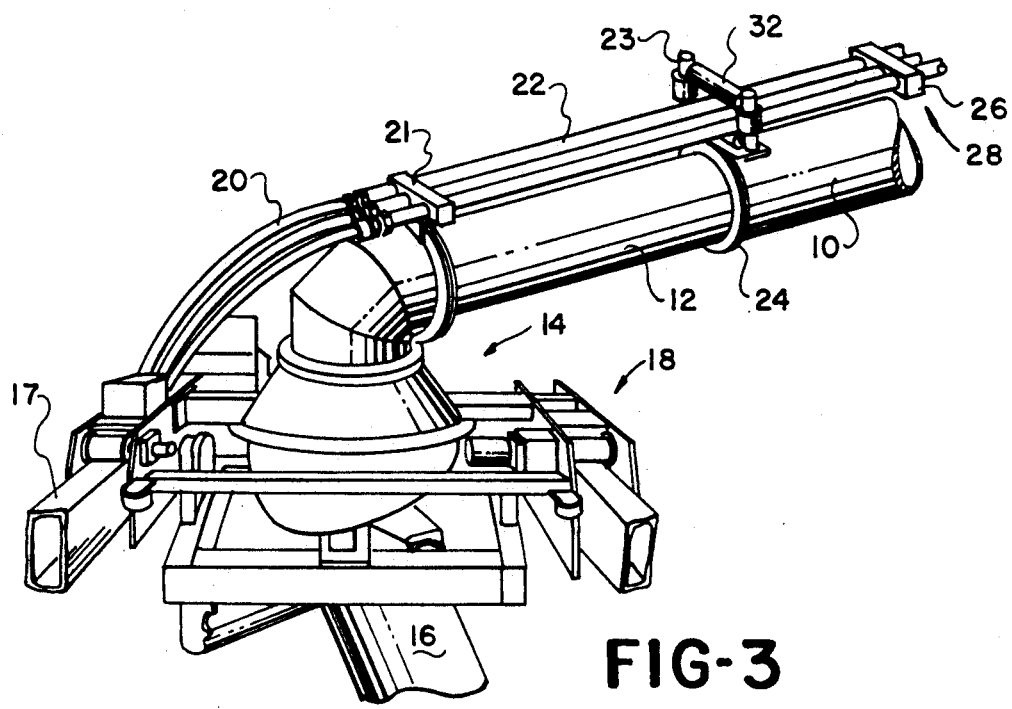
Fig. 3 is a perspective view of the horizontal run of the suction pipe showing the invention, carriage, and a partial view of some of the rails.
Figure 4:
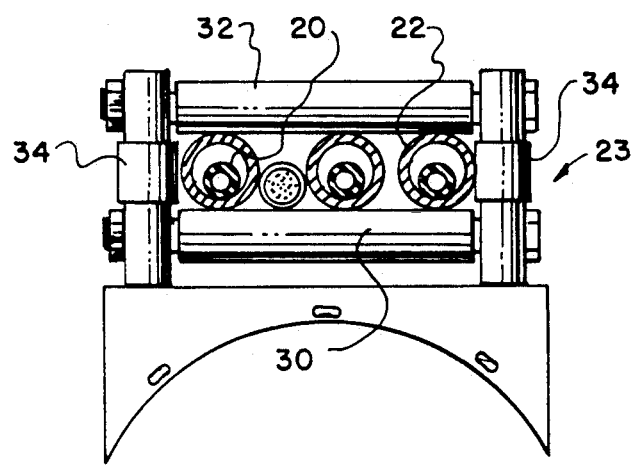
Fig. 4 is a detailed view of the roller guide of the invention taken substantially on line 4—4 of FIG. 2.
Figure 5:
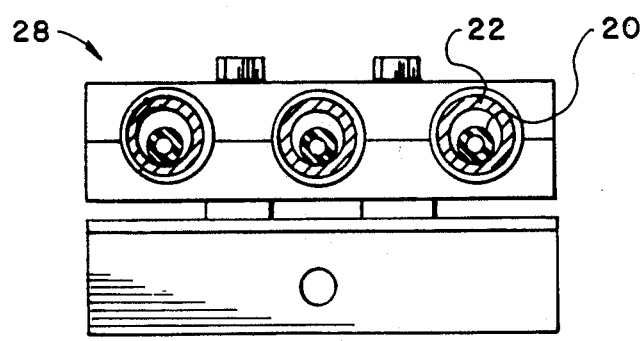
FIG. 5 is a detailed view of one of the clamps of the invention taken substantially on line 5—5 of of FIG. 2.

As an aid to correlating the terms of the claims to the exemplary drawings, the following catalog of elements and steps is provided:

9 cotton gin
10 stationary pipe
11 elbow
12 moving pipe
14 suction head
16 vertical suction pipe
17 carriage rails
18 carriage
19 stationary base
20 lines
21 conduit distal end
22 conduit
23 guide
24 medial end
  (stationary pipe)
26 proximal end
  (conduit)
28 proximal clamp
30 roller (lower)
32 roller (top)
34 rollers (side)

DESCRIPTION OF THE PREFERRED EMBODIMENT

Referring to the drawings, there may be seen a typical cotton gin suction pipe installation. Basically horizontal pipe 10 in the form of a suction pipe sleeve is connected to other pneumatic conveyors which convey the cotton into the cotton gin 9. The pipe 10 will be referred to as a stationary pipe although it will be understood that it is horizontally pivoted at elbow joint 11. In a broad sense the pipe 10 is a stationary element.

Moving pipe 12 is telescoped within the sleeve or stationary pipe 10. The moving pipe extends from its telescope portion to suction head 14. Vertical suction pipe 16 depends from the suction head. The suction head 14 is mounted upon carriage 18. The telescope joint between the pipes 10 and 12 permit the movement of the carriage 18. The moving pipe in a general sense is a moving element and the head and carriage a moving base upon the moving element.

For automatic operation lines 20 extend from a proximal end on the stationary pipe 10 to a distal end the head 14 on the carriage 18.

The lines 20 may be in the form of either electrical cables or hydraulic hoses. The proximal end of the lines 20 are connected to stationary or fixed base 19 which would be located on the proximal end of the pipe 10 that is near the elbow 11.

It will be understood that the lines are normally flexible and if not protected fall on carriage rails 17 or within the telescope portion of the moving pipe 12 within the stationary pipe 10 to be damaged. Because the lines 20 hang slack, they also tend to twist and foul.

Those with ordinary skill in the art will understand that the invention as described to this point is old and well known to the art.

Elongated supports in the form of conduit 22 are connected at a moving or attached or distal end 21 to the head 14. Guide 23 is attached on the stationary pipe 10 near its medial end 24. The conduit 22 is telescoped through the guide 23. The length of the conduit 22 would be about the same as the length as the moving pipe 12.

If there were only a single line 20 such as a single electrical cable it could be threaded or telescoped within the conduit so that the line would hang free between the fixed or stationary base 19 and guided or proximal end 26 of conduit 22. In this location, there are no moving elements to damage the line 20. Also, as the line 20 is free to move in this area, there is no likelihood of it tangling and fouling itself.

It will be understood that if there were a plurality of lines such as two or four hydraulic lines that there could be two or four conduits attached to the moving base or carriage 18 and extending to the proximal end 26. If there were a plurality of conduits it is desirable that they be connected by proximal clamp 28 at the proximal end 26 so that the plurality of conduits would all remain spaced apart and parallel to one another.

Guide 23 includes horizontal or lower roller 30 upon which conduits 22 ride. Additional roller 32 is spaced on the guide above the roller 30. The conduits 22 are guided between these two rollers 30 and 32. Two side rollers 34 guide the conduit laterally through the guide 23 and prevent lateral movements of the conduit 22.

If the lines included both hydraulic hoses and electrical cables, or if lines were to be added later, it would always be within the capabilities to secure as by strapping some of the lines to the conduits so that they were guided along side the conduits and prevented from hanging down or fouling because of their attachment to the conduits. Also, of course, according to the preference of some users, it might be preferable to use structural shapes such as angles, instead of the conduits 22. The support, whether it be of some structural shape other than a conduit would be sufficiently rigid or resistant to bending that it would support and guide the lines between the guide 23 and the moving base on carriage 18.

It will be understood that although this invention is described in connection with a cotton gin suction pipe, that the invention is applicable to any structure or machine in which there is a moving element mounted for rectilinear movement along a stationary elongated element and there are lines extending from the stationary element to the moving element.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. In a structure having two elements and two bases, namely;
   a. a moving base on
   b. a moving element which is mounted for rectilinear movement back and forth along
   c. an elongated stationary element having
   d. a stationary base with
   e. at least one flexible line extending between the moving base and stationary base;
   f. the improvement for protecting the line from being damaged comprising:
   g. an elongated support having
      i. an attached end and
      ii. a guided end attached to one of the bases on one of the elements,
   h. a guide attached to the other of the elements,
   j. said support between the attached and guided ends extending through the guide, and
   k. said line secured to said support.

2. The invention as defined in claim 1 further comprising:
   l. said support being a conduit, and
   m. said line being telescoped through said conduit.

3. The invention as defined in claim 1 wherein
   l. there being more one than one line,
   m. said lines being hydraulic lines,
   n. said supports being conduits, and
   o. said lines being telescoped through said conduits.

4. The invention as defined in claim 1 wherein
   l. said attached end of the support is attached to the moving element, and
   m. the guide is attached to the stationary element, and
   n. the lines are attached to the stationary base which is aligned with the moving base and guide, and
   o. the distance from the guide to stationary base is greater than the length of the support.

5. The invention as defined in claim 1 further comprising:
   l. there being a plurality of lines,
   m. at least one of said lines being attached to the support by strapping the line to the support.

6. The process involving structure having
   a. a moving base on
   b. a moving element which is mounted for rectilinear movement back and forth along
   c. an elongated stationary element having
   d. a stationary base with
   e. at least one flexible line extending between the moving base and stationary base;
   wherein the improved method comprises:
   f. securing said lines to an elongated support,
   g. attaching the support to one of said elements, and
   h. guiding said support by a guide on the other of said elements.

7. The invention as defined in claimed 6 further comprising:
   i. locating said guide on a line between said bases.

* * * * *